United States Patent [19]

Ohmura et al.

[11] Patent Number: 4,953,652
[45] Date of Patent: Sep. 4, 1990

[54] FOUR-WHEEL STEERING SYSTEM FOR MOTOR VEHICLE

[75] Inventors: Hiroshi Ohmura, Higashihiroshima; Takashi Nakashima, Hiroshima; Takeshi Murai, Hatsukaichi, all of Japan

[73] Assignee: Mazda Motor Corporation, Hiroshima, Japan

[21] Appl. No.: 187,920

[22] Filed: Apr. 29, 1988

[30] Foreign Application Priority Data

May 1, 1987 [JP] Japan .................................. 62-106261

[51] Int. Cl.$^5$ .............................................. B62D 5/04
[52] U.S. Cl. ...................................... 180/140; 280/91
[58] Field of Search ....................... 180/140, 142, 148; 280/91; 364/424.05; 303/92

[56] References Cited

U.S. PATENT DOCUMENTS

| | | | |
|---|---|---|---|
| 4,572,316 | 2/1986 | Kanazawa et al. | 180/143 |
| 4,740,002 | 4/1988 | Miyoshi | 280/91 |
| 4,782,907 | 11/1988 | Morishita et al. | 180/142 |

FOREIGN PATENT DOCUMENTS

| | | |
|---|---|---|
| 0154991 | 9/1985 | European Pat. Off. . |
| 0243180 | 10/1987 | European Pat. Off. . |
| 60-148767 | 8/1985 | Japan . |
| 61-089172 | 5/1986 | Japan . |
| 61-175183 | 8/1986 | Japan . |

*Primary Examiner*—David M. Mitchell
*Assistant Examiner*—Donn McGiehan
*Attorney, Agent, or Firm*—Fleit, Jacobson, Cohn, Price, Holman & Stern

[57] ABSTRACT

A four-wheel steering system for motor vehicle including a front wheel steering mechanism for steering front wheels in response to a steering wheel, a rear wheel steering mechanism in accordance with the movement of the front wheels, control unit having driving condition detecting means for detecting a vehicle driving condition and controlling the rear wheel steering mechanism, fail judging section for judging a failure of the control unit and producing a failure signal, and fail-safe control unit for controlling the rear wheel steering mechanism in a manner different from a control under a normal operation of the control unit when the control unit is in an unusual condition, and the fail judging section and/or the fail-safe control unit being provided with a plurality of actuating mechanism wherein each of the actuating mechanism can actuate the fail judging section and the fail-safe control unit independently to position the rear wheels at a neutral position.

25 Claims, 6 Drawing Sheets

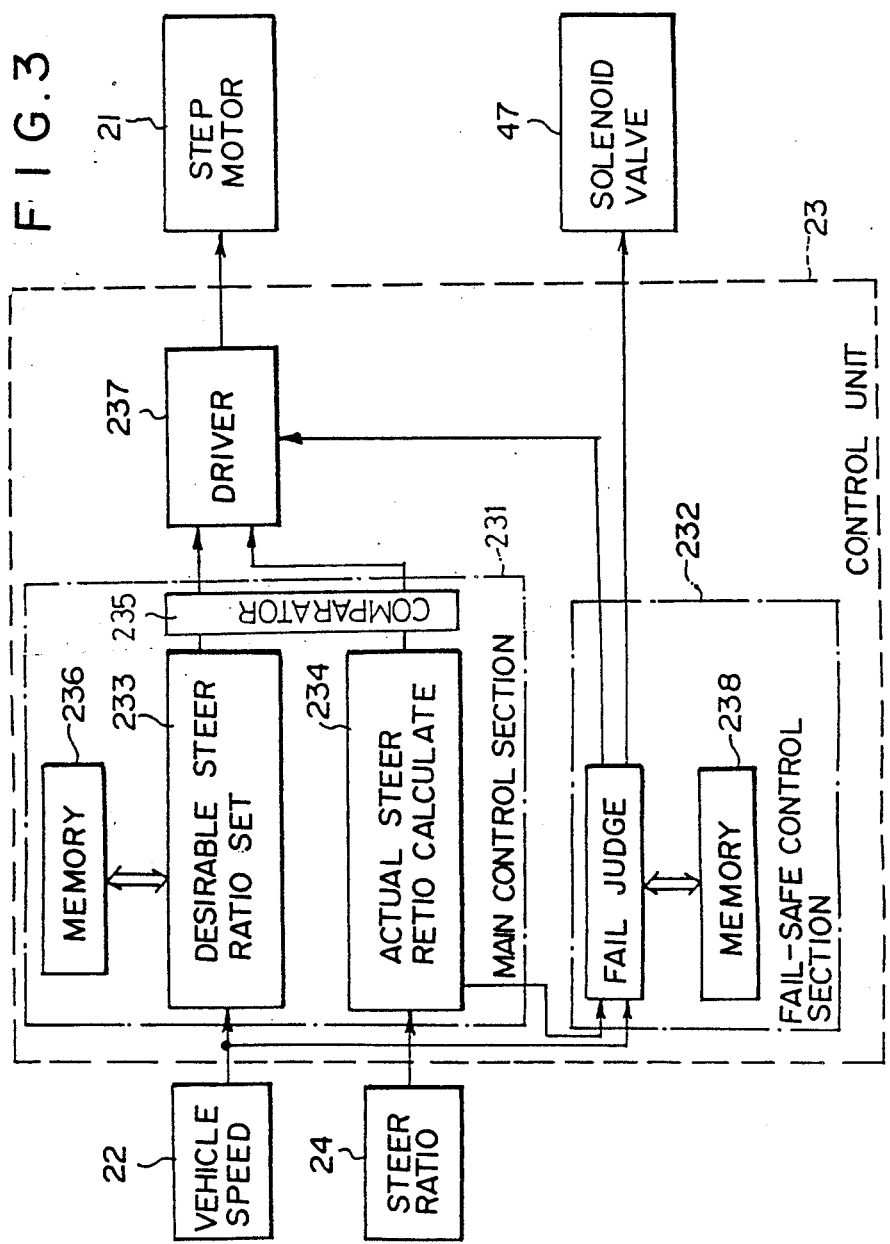

FOUR-WHEEL STEERING SYSTEM FOR MOTOR VEHICLE

BACKGROUND OF THE INVENTION

1. Field of the invention

The present invention relates to a four-wheel steering vehicle adapted to steer rear wheels as well as front wheels, more particularly to a fail-safe system for a four-wheel steering vehicle.

2. Description of the Prior Art

In the steering system for four-wheel vehicles, recently, there has been proposed so called four-wheel steering vehicles as shown in Japanese patent public disclosure No. 60-163769 in which not only rear wheels but also front wheels are steered so that the drivability of the vehicles and the safety for the passengers can be improved.

In the four-wheel steering vehicle, the rear wheels are steered in the same direction as a direction in which the front wheels are steered (positive steering condition) in a high-vehicle speed operation. As a result, the vehicle is maintained substantially on a tangential line of a turning circle to obtain a smooth movement of the vehicle in such as a lane change operation in a high vehicle-speed condition. On the other hand, when the vehicle is under a low vehicle-speed operation, the rear wheels are steered in a direction opposite to a direction in which the front wheels are steered (negative steering condition) in a low vehicle-speed condition. As a result, it is easy to change the direction of the vehicle so that the turning radius is reduced to facilitate a U-turn operation, a parking operation, and a garaging operation.

There is disclosed in Japanese patent public disclosure No. 59-48054 a four-wheel steering system provided with a steering ratio changing mechanism in which a ratio of the steering amount of the rear wheels to that of the front wheels (steering ratio) is changed in accordance with the vehicle speed. The steering ratio changing mechanism is provided with a steering ratio sensor and a stepping motor, and a controller constituted by a micro computer wherein the controller carries out a feedback control of the stepping motor based on the output of the steering sensor in such a manner that the steering ratio changes continuously between a value of the positive steering condition and a value of the negative steering condition in accordance with the vehicle speed.

The four-wheel steering vehicles as disclosed in the Japanese patent public disclosure No. 59-48054 is provided with a rear wheel steering mechanism as well as a front wheel steering mechanism. The rear wheel steering mechanism is adapted to be driven by an assistance of a power steering mechanism actuated by a hydraulic pressure in relation with the steering ratio changing mechanism. The rear steering mechanism is provided with a solenoid valve for removing the hydraulic pressure applied to the power steering mechanism and a centering spring for returning the rear wheels back to a neutral direction thereof. In the case where a trouble occurs in the control system for the four-wheel steering system, the controller produces an emergency signal to actuate the solenoid valve and thereby release the hydraulic pressure applied to the power steering mechanism. As a result, the rear wheels is returned back to the neutral position by means of the centering spring so that the vehicle can be operated as well as a two-wheel steering vehicle and can obtain a safety in the four-wheel steering mechanism.

It should be however noted that if the hydraulic system for control the power steering system does not work properly, the safety of the vehicle would not be maintained.

SUMMARY OF THE INVENTION

It is therefore an object of the invention to provide a f system for improving the safety of a four-wheel steering mechanism.

It is another object of the invention to provide a fail-safe mechanism in which a hydraulic pressure is cut off from a rear steering in an unusual condition so as to obtain a safety of vehicle.

It is further object of the invention to provide a fail-safe system which is operated based on electrical signals.

It is still further object of the invention to provide a fail-safe system having at least two independent mechanism by which a steering control system can escape from an unusual condition of the four-wheel steering vehicle.

According to the present invention, there is provided a four-wheel steering system for motor vehicle including a front wheel steering mechanism for steering front wheels in response to an operation of a steering wheel, a rear wheel steering mechanism in accordance with the steering movement of the front wheels, control means having driving condition detecting means for detecting a vehicle driving condition and controlling the rear wheel steering mechanism, fail judging means for judging a failure of the control means and producing a failure signal denoting the failure, and fail-safe means for controlling the rear wheel steering mechanism in a manner which is different from a control under a normal operation of the control means when the control means is in an unusual condition in which a proper steering control cannot be performed, and the fail judging means and/or the fail-safe means being provided with a plurality of actuating means wherein each of the actuating means can actuate the fail judging means and the fail-safe means independent of each other.

The four-wheel steering system may include a steering ratio changing mechanism for changing a steering ratio of a steering amount of rear wheels to a steering amount of front wheels, a stepping motor for driving the steering ratio changing mechanism, and a controller for controlling an operation of the stepping motor by detecting a stepped position of the motor, the stepping motor being controlled by the controller to rotate by a predetermined amount to thereby actuate the steering ratio changing mechanism in such a manner that a value of the steering ratio is changed between a negative steering value in which the rear wheels are steered in a direction opposite to a steering direction of the front wheels and a positive steering value in which the rear wheels are steered in the same direction as a steering direction of the front wheels, wherein the controller speculates the stepped position of the stepping motor based on informations memorized in the controller when the controller fails to detect the correct stepped position of the motor and controls the stepping motor to drive the steering ratio changing mechanism at a position of zero value of the steering ratio so as to provide a neutral position in the rear wheel direction in the case where the controller speculates that the rear wheels are steered at a direction in the negative steering.

According to features of the present invention, in the case where a trouble occurs in a steering ratio sensing mechanism for sensing the steering ratio, when the rear wheels is in a position of the negative steering condition, in other word, when the rear wheels are steered in a direction opposite to the front wheels, the rear wheels are positioned at the neutral potion thereof so that the vehicle can be operated as if it is a two-wheel steering vehicle. Therefore, the safety of the vehicle can be obtained even in such an unusual condition.

Further, even when a trouble occurs in a solenoid valve incorporated as a fail-safe system into a hydraulic passage of a power steering mechanism for assisting the rear steering mechanism, the rear wheels are held at the neutral steering position because the stepping motor is driven to provide the steering ratio changing mechanism with a zero value of the steering ratio resulting in an improvement of the safety of the vehicle.

The above and other objects and features of the present invention will be apparent from the following description by taking reference with accompanying drawings employed for a preferred embodiment of the present invention.

BRIEF DESCRIPTION OF THE DRAWINGS

FIG. 3 is a block chart showing a control unit for controlling a steering ratio between the rear wheels and front wheels;

DESCRIPTION OF PREFERRED EMBODIMENTS

Figure 1:
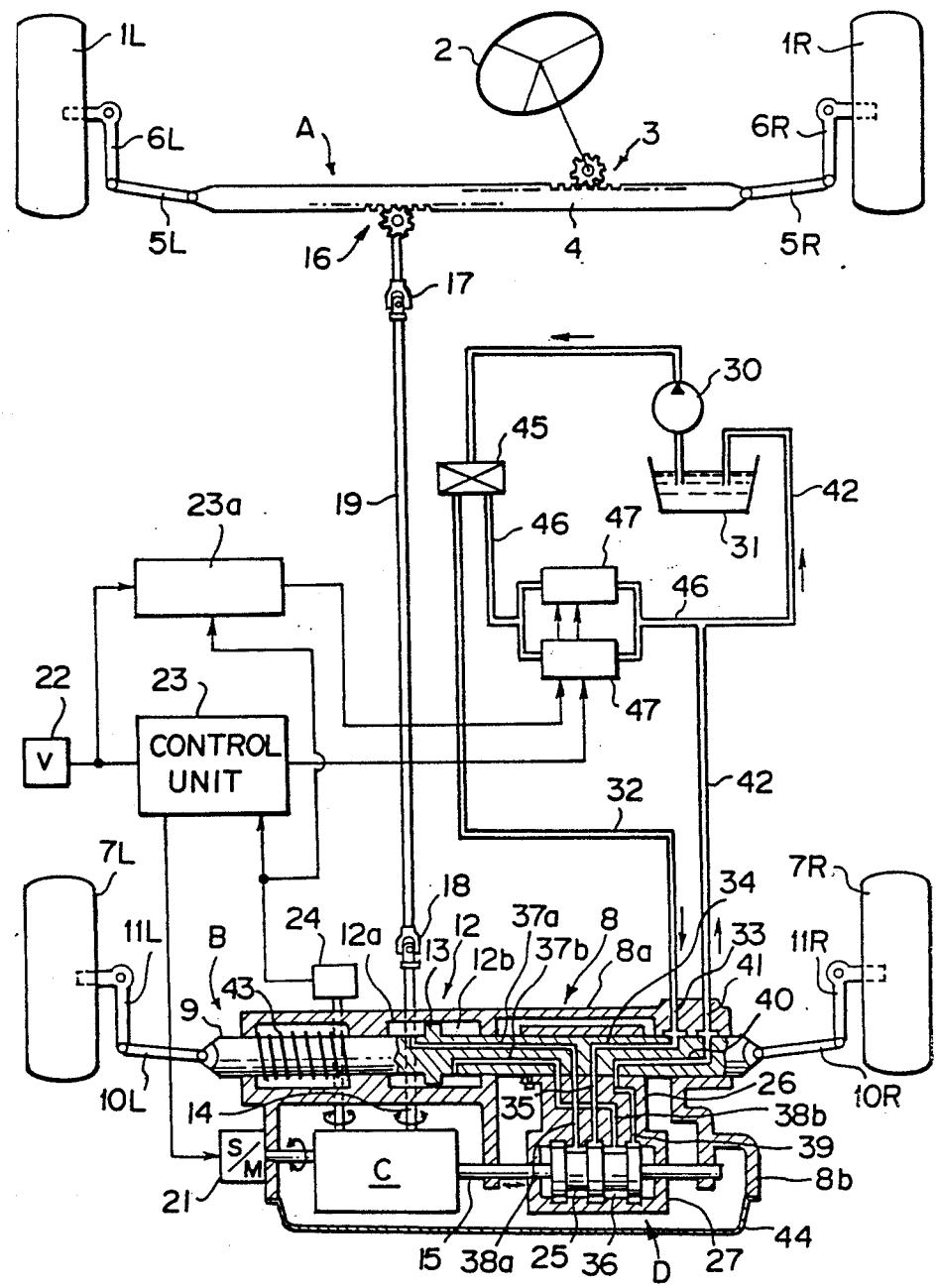
FIG. 1 is a schematic view of a four-wheel steering mechanism in accordance with the present invention.

Referring to FIG. 1 in which a schematic view of a four-wheel steering system is shown, there is provided a front steering mechanism A for steering a right and left front wheels 1R, 1L. The front steering mechanism A includes a steering wheel 2, a rack and pinion mechanism 3 for changing a rotative movement of the steering wheel to a reciprocating movement of rod 4 which is incorporated to the mechanism 3 for steering the front wheels 1R, 1L, and a right and left knuckle arms 6R, 6L connected to the opposite ends of the rod 4 through respective tie rods 5R, 5L.

A rear wheel steering mechanism B for steering a right tna left rear wheels 7R, 7L is provided with a tubular casing 8a constituting a part of the housing 8, a rear wheel steering rod 9 slidably mounted in the tubular casing 8a in the traverse direction of vehicle, a right and left knuckle arms 11L, 11L connected to the opposite ends of the rear wheel steering rod 9 through respective tie rods 10R, 10L. The axial movement of the rod 9 produces a steering of the rear wheels 7R, 7L. The rod 9 is integrally combined with a power steering mechanism for assisting a movement of the rod 9. The rod 9 passes through a power cylinder 12 integrated with the casing 8a. The rod 9 is formed with a piston 13 which is located in a bore of the cylinder 12 and divide it into hydraulic chambers 12a, 12b. There is provided a steering ratio changing mechanism for controlling the rear wheel steering rod 9 in accordance with a given value of a steering ratio of the steering amount of the rear wheels 7R, 7L to a steering amount of the front wheels 1L, 1L. The steering ratio changing mechanism C is provided with an input shaft 14 and a control rod as an output shaft 15. A second rack and pinion mechanism 16 provided on the front steering rod 4 changes the reciprocating movement of the rod 4 in accordance with an operation of the steering wheel 2 to a rotative movement. The rotative movement is transmitted to the input shaft 14 of the steering ratio changing mechanism C through universal joints 17, 18 and a connecting rod 19. The control rod 15 can move in parallel with the rear wheel steering rod 9. The steering ratio changing mechanism C is provided with a step motor 21 for changing a steering ratio (an angular steering amount of the rear wheels $\theta_R$/an angular steering amount of the front wheels $\theta_F$) in accordance with the vehicle speed wherein the mechanism C is controlled in the direction and amount of the rotation thereof by means of a control unit 23 which is adapted to receive a vehicle speed signal from a vehicle speed sensor 22.

A steering ratio sensor 24 is provided over the housing 8. A signal is supplied to the control unit 23 so that the stepping motor is feedback-controlled. A detail explanation about the structure and operation of the steering ratio changing mechanism C as employed herein is described in Japanese patent public disclosure No. 59-48054 which is assigned by the same assignee as the present application.

A hydraulic control mechanism D for controlling the power cylinder 12 is provided with a hydraulic valve 25 for switching hydraulic passages. The mechanism D is disposed with the steering ratio changing mechanism C in the casing 8b integrated with the tubular casing 8a which receives the rear steering rod 9. The hydraulic valve 25 is slidably positioned in a valve housing 27 which is fixed to the rear wheel steering rod 9 through a connecting portion 26. The hydraulic valve 25 is provided on the control rod 15 extending from the steering ratio changing mechanism C so as to move in a direction parallel to the rear steering rod 9, or in a transverse direction of the vehicle.

Figure 2:
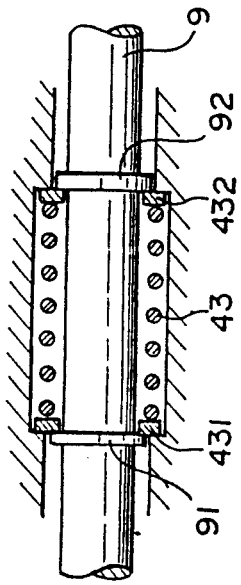
FIG. 2 is a sectional view showing a centering spring.

There are provided a plurality of hydraulic passages in the housing 8a, the rod 9 and the connecting portion 26 for supplying hydraulic pressures to the housing 27, the hydraulic chambers 12a, 12b of the power cylinder 12. The hydraulic oil in an oil tank 31 is pressurized by an oil pump 30 and introduced into a hydraulic passage 32 through an oil filter 45. Then the hydraulic pressure is introduced into a hydraulic passage 33 in the fousing 8a and thereafter into a hydraulic chamber 36 in the valve housing 27 through a hydraulic passage 34 in the rod 9 and a hydraulic passage 35 in the connecting portion 26. The chambers 12a, 12b of the power cylinder 12 is communicated with the chamber 36 through hydraulic passages 37a, 37b in the rear steering rod 9 and hydraulic passages 38a, 38b in the connecting portion 26. The chamber 36 is adapted to be communicated with the oil tank 31 through a hydraulic passage 39 in the connecting portion 26, a hydraulic passage 40 in the rod 9, and a hydraulic passage 41 in the casing 8a and thereafter through a hydraulic passage 42. The rod 9 can move within the casing 8a in the transverse direction corresponding to the reciprocating movement of the control rod 15 in the transverse direction of the vehicle. As shown in FIG. 2 more clearly, there is provided a centering spring 43 between the rod 9 and casing 8a for positioning the rod 9 at a neutral position when the hydraulic pressure is removed from the power cylinder 12. As shown clearly in FIG. 2, the casing 8a is formed with a chamber 81 in which the spring 43 is disposed to urge O-rings 431, 432 at the opposite ends against stepped portions 811, 812 of the chamber 81. The o-rings 431, 432 are engaged with flange member 91, 92 fixed to the rod 9 to be compressed. When the rod is moved in the axial direction to either the right or the left by a hydraulic pressure, the centering spring 43 is compressed to increase the resilient force to cause the rod 9 to return to the neutral position thereof.

Below the steering ratio changing mechanism C and the hydraulic control mechanism D, an oil pan 44 is mounted on the casing 8b with the pan 44 being filled with oil for lubrication.

To the oil filter 45 is connected with a bypass hydraulic passage 46 which is connected with the hydraulic passage 42 through a pair of solenoid valves 47, 47. The valves 47, 47 are provided in parallel with each other for opening and closing the passage 46 based on the output of the control unit 23.

Figure 4:
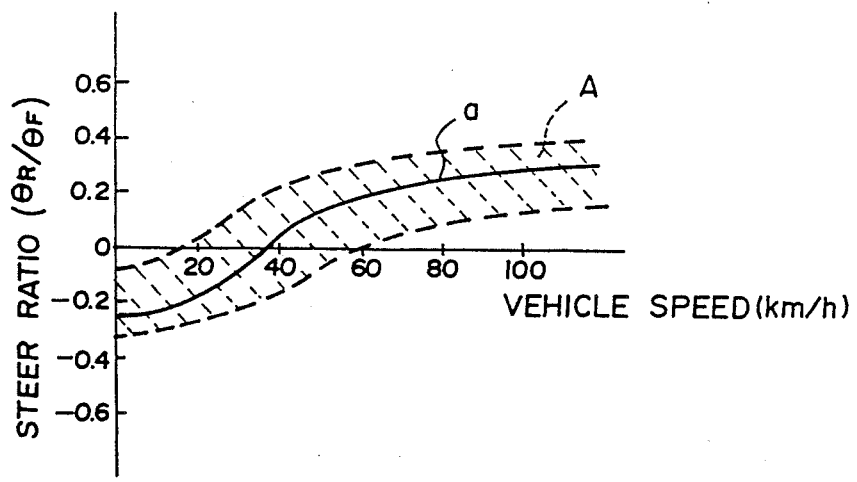
FIG. 4 is a graphical representation showing a between the steering ratio and a vehicle speed.

As shown in FIG. 3, the control unit 23 is provided with a main control section 231 and a fail-safe control section 232. The main control section 231 is adapted to control the steering ratio changing system C in a normal condition of the system wherein the steering control can be done properly. The main control section 231 includes a desirable steering ratio setting section 233 for setting a desirable steering ratio based on the output of the vehicle speed sensor 22, a steering ratio calculating section 234 for calculating an actual steering ratio based on the output of the steering ratio sensor 24 and a comparator 235 for comparing the outputs of the steering ratio setting section 233 and steering ratio calculating section 234 and producing signals corresponding to the difference between the outputs of sections 233 and 234. The steering ratio setting section 233 sets a desirable steering ratio in view of a property line a (shown in FIG. 4) which is stored in a memory 236 as a map. The signals from the comparator 235 is introduced into the stepping motor through a driver 237 to drive the steering ratio changing mechanism C.

On the other hand, the fail-safe control section 232 is adapted to operate in an unusual condition in which the steering control cannot be done properly to control the stepping motor 21 through the driver 237 and the solenoid valves 47, 47. The fail-safe control section 232 receives the signals from the vehicle speed sensor 22 and the steering ratio calculating section 234 and judges whether the steering control is in a normal condition or not in view of a predetermined region A (shown in FIG. 4) which is stored in memory 238 as a map.

The solenoid 47, 47 are kept normally ON to close the passage 46. However when a trouble occurs in the control system, the solenoid 47, 47 are turned off by the signal from the control unit 23 to open the bypass passage 46 so that the hydraulic pressure produced by the pump 30 is released through the bypass passage 46 and removed from the power cylinder 12. As the result, the rear wheel steering rod 9 is returned to the neutral position by the resilient force of the centering spring 43. As a result the rear wheels are not steered under the unusual condition of the vehicle.

The steering control system of the illustrated embodiment is provided with another fail-safe unit 23a for controlling the operation of the solenoid valves 47, 47. The unit 23a is provided as a backup unit of the control unit 23. The unit 23a receives signals from the vehicle speed sensor 22 and the steering ratio sensor 24 and produces signals for turning off the solenoid valves 47, 47 under a predetermined condition of the vehicle regardless of the operation of the control unit 23.

Figure 5:
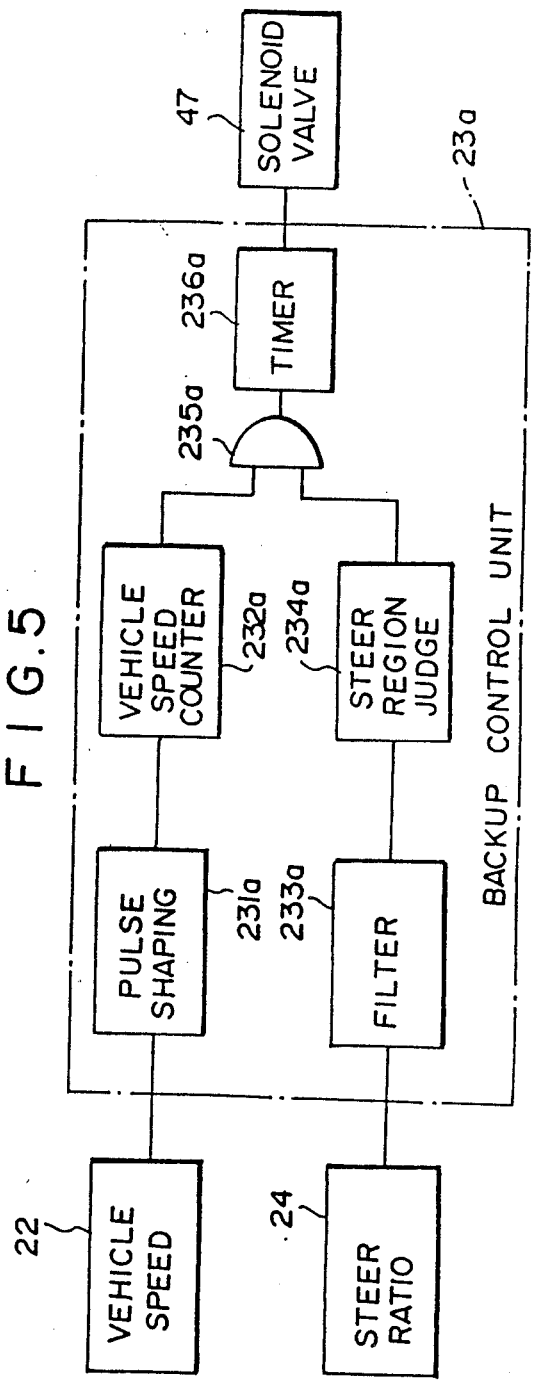
FIG. 5 is a block chart of a backup control unit.

Now referring to FIG. 5, the backup unit 23a include a pulse shaping section 231a for shaping a pulse wave from the vehicle speed sensor 22, a vehicle speed counter section 232a for judging whether or not the vehicle speed is higher than a predetermined speed, e.g. 35 km/h and producing signals of High when the speed is higher than the predetermined value, a filter section 233a for filtrating the signals from the steering ratio sensor 24, a region judging section 234a receiving the signals from the filter section 233a and producing signals of High when the rear wheels are steered in the negative steering position, an AND circuit section 235a receiving the signals from the speed counter 232a and the region judging section 234a and producing High signal when the signals from both the counter section 232a and the region judging section 234a are High, and a timer section 236a. The timer section 236a is provided for preventing from the unit 23a from judging an unusual condition when the stepping motor 21 cannot catch up with an abrupt change in the vehicle speed under a certain vehicle operating condition.

Hereinafter, there is described a control of the steering control system of the structure as aforementioned.

Figure 6:
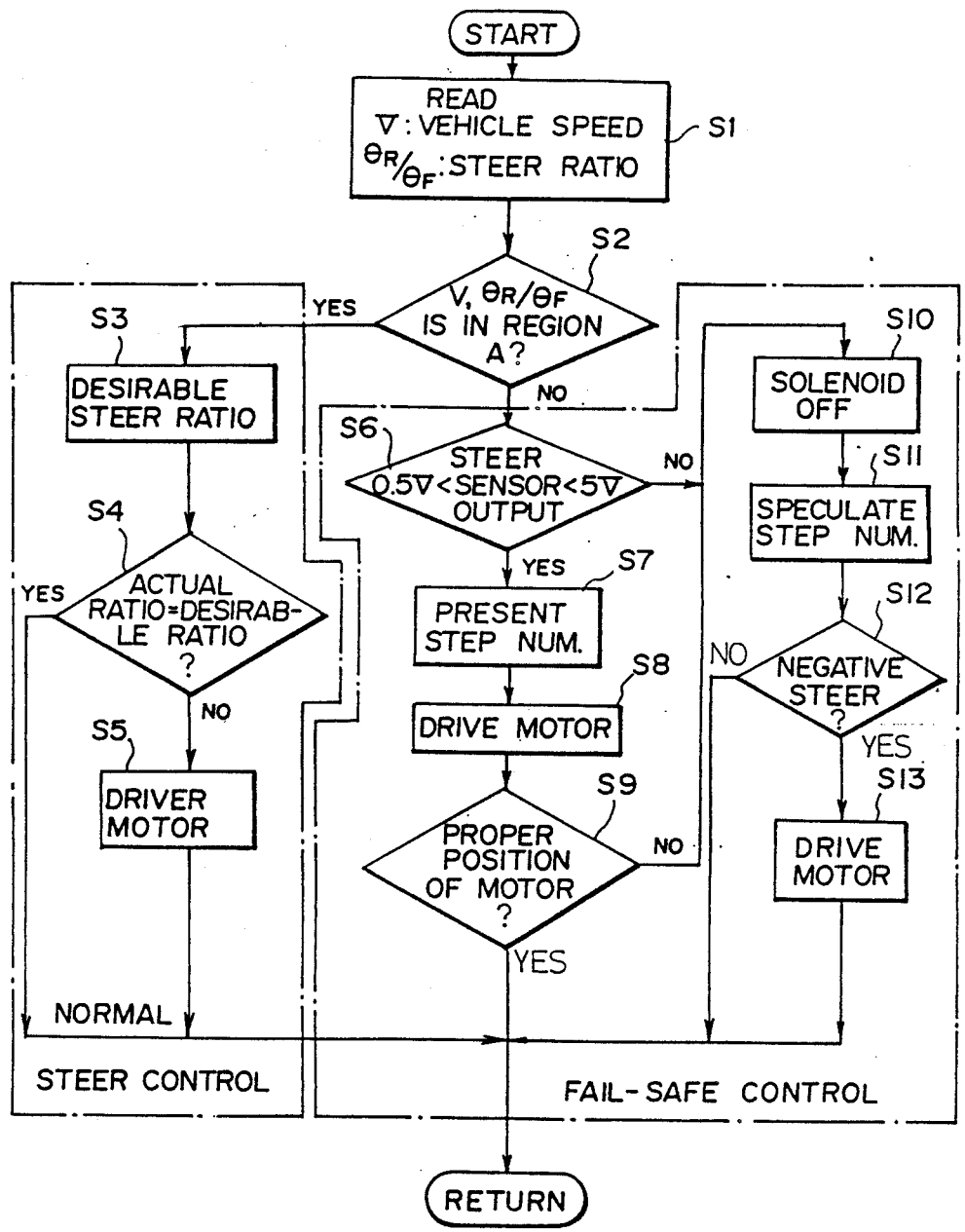
FIG. 6 is a flow chart of the control carried out by the control unit in accordance with the present invention.

Referring to FIG. 6, there is shown a flow chart of a control in accordance with the present invention.

The control unit 23 reads signals denoting a steering ratio and a vehicle speed from the sensors 22 and 24 (S1). In next, the control unit 23 judges whether or not a relationship between the vehicle speed and the steering ratio is in the predetermined region A (hatched portion) in FIG. 4 (S2). When the judgment in the step S2 is YES, the control system is in a normal condition. Under the condition, the control unit 3 determines a desirable steering ratio based on signals from the vehicle speed sensor 22 and steering ratio sensor 24 in view of the property line a shown in FIG. 3 (S3)

In next step, the control unit 23 compares the desirable steering ratio and an actual steering ratio obtained through the steering ratio sensor 24 (S4). Then when there is a difference between the desirable value and actual value of the steering ratio, the control unit 23 produces a signal to cause the stepping motor 21 to accomplish the desirable steering ratio (S5).

In step S2, where the relationship is outside of the region A, in other words, where the judgment is No, the control unit 23 holds that some troubles have occurred in the steering control system.

Figure 7:
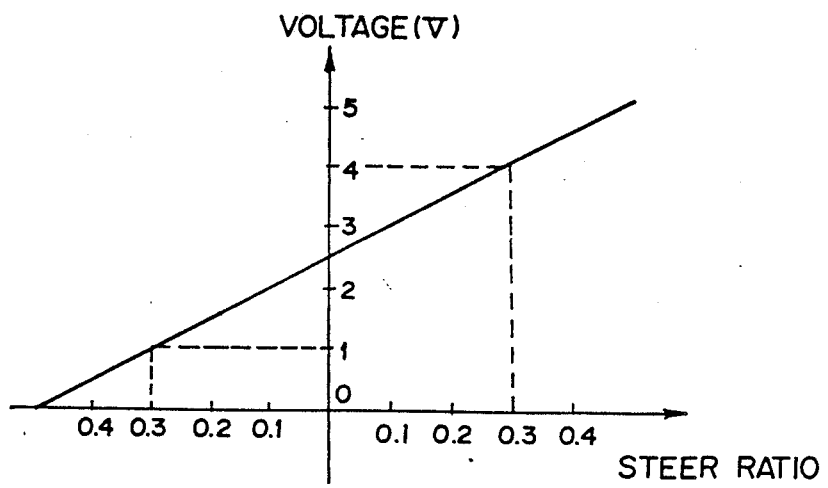
FIG. 7 is a graph showing a relationship between steering ratio and output voltage from a steering ratio sensor.

Next, the control unit 23 judges whether or not the output voltage of the steering ratio sensor 24 is within a predetermined region (S6). As shown in FIG. 7, the steering ratio sensor produces a voltage signal in response to a value of the steering ratio Under a normal steering control, the steering ratio is controlled to a region of −0.3 to +0.3 to provide a region of the voltage signal of approximately 1 V to 4 V. Therefore, in the illustrated embodiment, the control unit 23 judges an unusual condition of the steering ratio sensor 24 when the voltage signals from the sensor is outside of the region of 0.5 V to 5 V. However, when the output of the steering ratio sensor 24 is within the region of 0.5 V to 5 V, that is, when the judgment in step S6 is YES, the control unit 23 judges that the trouble occurs in a component, such as the vehicle speed sensor 22, the solenoid valve 47, power supply system to the valve 47, and the power steering mechanism, other than the steering ratio sensor 24. In this case, the control unit 23 goes to step S7 to calculate the stepped number of stepping motor 21 and thereby learn the present stepped position of the stepping motor 21. Thereafter, in step S8 the control unit 23 drive the motor 21 to return the steering changing mechanism back to the neutral position thereof in which the steering ratio is zero. In step S9, the control unit 23 judges whether or not the stepping motor 21 is positioned in a predetermined region including a position corresponding to the zero value of the steering ratio. The step S9 is provided for confirming the finish of a fail-safe procedure for the steering ratio changing mechanism C.

On the other hand, in step S6, where the judgment is NO, that is, where the control unit 23 is out of order or cannot grasp the correct stepped position of the stepping motor 21 due to a trouble of the steering ratio sensor 24, the control unit 23 and the like, the solenoids of the valves 47, 47 are turned off so that the bypass passage 46 is opened to release the hydraulic pressure applied to the power steering mechanism therethrough (S10). As a result, the rear wheels 7R, 7L are positioned at the neutral positions due to the resilient force produced by the centering spring 43. In next step S11, the control unit 23 gets the stepped number of the motor 21 from the map of the FIG. 4 in the memory 238 of the fail-safe control section 232 in view of an output of the vehicle speed sensor 22. In next step S12, the control unit 23 speculates whether or not the present stepped position of the motor 21 is in the negative steering position in which the rear wheels 7R, 7L are steered in a direction opposite to a direction in which the front wheels 1L, 1L are steered. In this speculation, where the control unit 23 holds that the rear wheels 7R, 7L are steered in the negative steering position, the control unit 23 produces signals for driving the stepping motor 21 and causing the steering ratio changing mechanism C to position the rear wheels 7R, 7L at the neutral position thereof (S13) On the other hand, where the judgment in the step S12 is NO, the control unit 23 completes the fail-safe procedure on the instant. In addition, when the judgment in step S9 is NO, the control unit 23 also goes to step S6 to position the rear wheels 7R, 7L at the neutral position Therefore, if the step motor 21 fails to position the rod 9 at the neutral position, the solenoid valves 47, 47 are turned off in step S10 to release the hydraulic pressure for controlling the steering ratio changing mechanism C. As a result, the rod 9 is positioned at the neutral position due to the resilient force of the centering spring 43. Further, even if the solenoid valves 47, 47 do not work properly in step S10 so that the hydraulic pressure remains in the steering ratio changing mechanism C, the rear wheels 7R, 7L can be positioned at the neutral position through the procedures of step S11 to S13.

According to the illustrated embodiment, in addition to the above fail-safe control, the backup control unit 23a is actuated under a certain condition to position the rear wheels 7R, 7L at the neutral position independent of the control unit 23.

Figure 8:
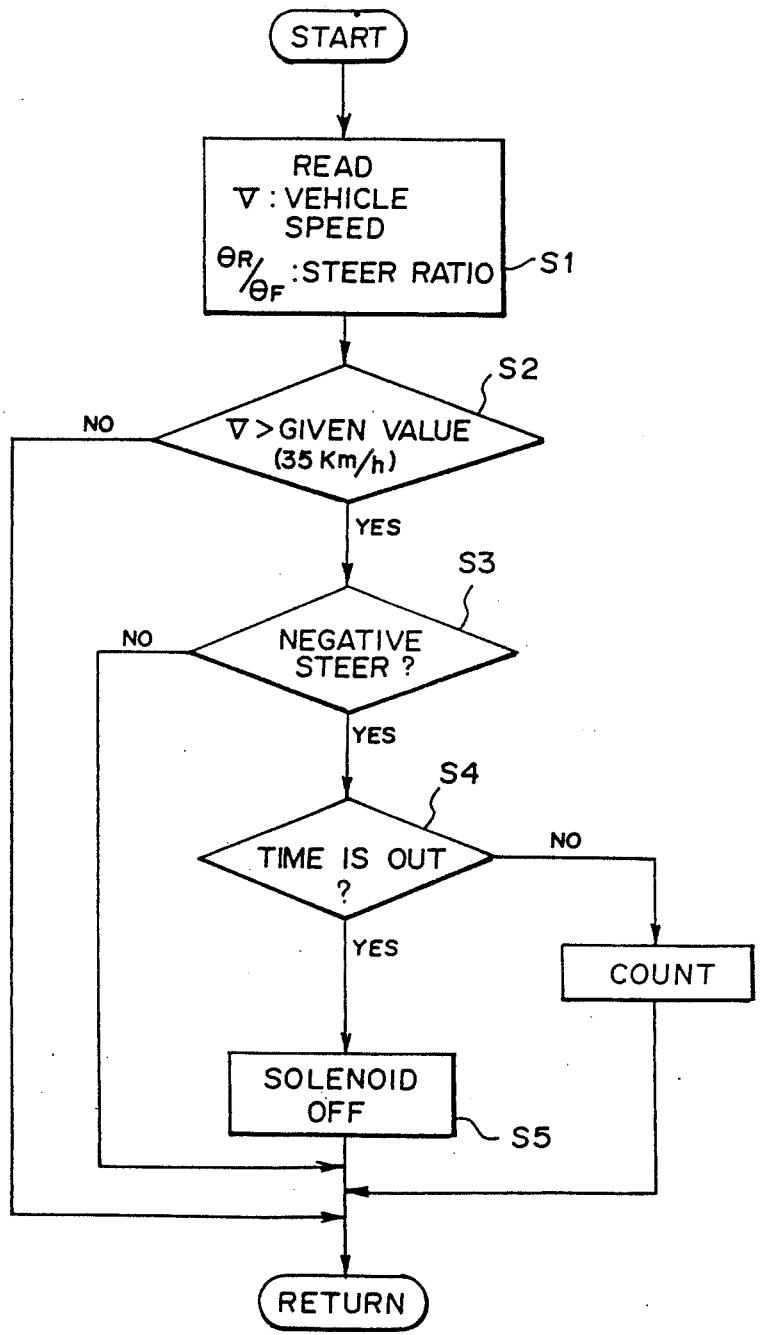
FIG. 8 is a flow chart of a control carried out by the backup control unit.

Referring to FIG. 8, the backup control unit 23a reads the vehicle speed and steering ratio from the outputs of the sensors 22 and 24 (S1). Then the backup control unit 23a judges whether or not the vehicle speed is higher than a predetermined value such as 35 km/h (S2). If the judgment is YES, the unit 23a goes to the next step S3 and judges whether or not the rear wheels 7R, 7L are steered in the negative position from the output of the steering ratio sensor 24. If the rear wheels 7R, 7L are steered in the negative steering position, the unit 23a judges whether or not the condition continues more than a predetermined period (S4). If so, the backup control unit 23a produces a signal to turned off the solenoid valves 47, 47 (S5).

As clearly apparent from the above description, there are provided at least two fail-safe system which operate independently for escaping an unusual condition of the four-wheel steering control system resulting in an improved safety system of the four-wheel steering vehicle.

We claim:

1. A four-wheel steering system for motor vehicle including
   a front wheel steering mechanism for steering front wheels in response to an operation of a steering wheel,
   a rear wheel steering mechanism for steering rear wheels in accordance with the steered movement of the front wheels,
   control means having driving condition detecting means for detecting a vehicle driving condition and controlling the rear wheel steering mechanism in accordance with the vehicle driving condition,
   fail judging means for judging of a failure of the control means and producing a failure signal denoting the failure, and
   fail-safe means for receiving the failure signal from the fail judging means and controlling the rear wheel steering mechanism independently from the control means when the control means is in an unusual condition, wherein
   the fail judging means being provided with first fail judging means and second fail judging means adapted to be actuated independently for judging different fail conditions,
   the control means being provided with a control unit for receiving signals from said driving condition detecting means and producing control signals to the rear wheel steering mechanism,
   the first fail judging means being provided in the control unit, and
   the second fail judging means being provided in a back up control unit independent from the control unit.

2. A four-wheel steering system in accordance with claim 1 in which the driving condition detecting means includes a vehicle speed sensor and a rear wheel steering amount sensor, the control unit being adapted to receive signals from the vehicle speed sensor and produce steering signals for steering the rear wheels in a direction opposite to the direction in which the front wheels are steered when the vehicle speed is low and in the same direction as a direction in which the front wheels are steered when the vehicle speed is high, and the second fail judging means being adapted to receive signals from the vehicle speed sensor and a rear steering amount sensor and to product failure signals of the control means when it is detected that the rear wheels are steered in a direction opposite to a direction in which the front wheels are steered in a high vehicle speed condition.

3. A four-wheel steering system in accordance with claim 2 in which the second fail judging means is provided with timer means for producing failure signals of the control means when it is detected for more than a predetermined period that the rear wheels are steered in a direction opposite to a direction in which the front wheels are steered in a high vehicle speed condition.

4. A four-wheel steering system in accordance with claim 2 in which the rear wheel steering mechanism includes a steering ratio changing mechanism for changing a steering ratio of a steering amount of the rear wheels to a steering amount of the front wheels, the rear wheel steering amount sensor being constituted by a steering ratio sensor provided in the steering ratio changing mechanism.

5. A four-wheel steering mechanism in accordance with claim 1 in which the fail-safe means prevent the rear wheels from steering in a negative position wherein the rear wheels is angularly positioned in a direction opposite to a direction in which the front wheels is positioned.

6. A four-wheel steering system in accordance with claim 5 in which the fail-safe means is actuated to position the rear wheel at a neutral position.

7. A four-wheel steering system in accordance with claim 1 wherein the fail-safe means is provided with first fail-safe means and second fail-safe means adapted to be actuated independently for different fail-safe controls.

8. A four-wheel steering system for motor vehicle including
   a front wheel steering mechanism for steering front wheels in response to an operation of a steering wheel,
   a rear wheel steering mechanism for steering rear wheels in accordance with the steered movement of the front wheels,
   control means having driving condition detecting means for detecting a vehicle driving condition and controlling the rear wheel steering mechanism in accordance with the vehicle driving condition,
   fail judging means for judging of a failure of the control means and producing a failure signal denoting the failure, and
   fail-safe means for receiving the failure signal from the fail judging means and controlling the rear wheel steering mechanism independently from the control means when the control means is in an unusual condition,
   wherein the fail-safe means is provided with first fail-safe means and second fail-safe means adapted to be actuated independently for different controls,
   the control means including steering ratio setting means for setting a steering ratio of a steering amount of the rear wheels to a steering amount of the front wheels, the first fail-safe means being adapted to change the steering ratio set by the steering ratio setting means, and the second fail-safe means being provided in the rear wheel steering mechanism.

9. A four-wheel steering system in accordance with claim 8 in which the rear wheel steering mechanism includes a steering ratio changing mechanism for changing the steering ratio, and a hydraulic cylinder for producing a steering force for the rear wheels by a hydraulic pressure which is generated by a hydraulic pump, the first fail-safe means being adapted to drive the steering ratio changing mechanism and the second fail-safe means being constituted by relief valve means provided in a hydraulic system between the hydraulic pump and the hydraulic cylinder.

10. A four-wheel steering system in accordance with claim 9 in which the second fail-safe means is provided with a pair of relief valve means in parallel with each other.

11. A four-wheel steering system in accordance with claim 9 in which the rear wheel steering mechanism is provided with a centering spring for positioning the rear wheels at a neutral position.

12. A four-wheel steering system in accordance with claim 9 in which the rear wheel steering mechanism is provided with a stepping motor for driving the steering ratio changing mechanism, the control means being adapted to speculate the present stepped position of the stepping motor based on information memorized in the control means when the control means cannot grasp the correct stepped portion of the stepping motor and to cause the first fail-safe means to drive the stepping motor when it is judged that the rear wheels are steered at a negative steering condition wherein the rear wheels is angularly positioned in a direction opposite to the front wheels through the speculation of the control means so that the steering changing mechanism is driven so as to escape the negative steering condition of the rear wheels.

13. A four-wheel steering system in accordance with claim 12 in which the first fail-safe means drives the stepping motor to position the steering ratio changing mechanism at a position where the steering ratio is zero.

14. A four-wheel steering system in accordance with claim 12 in which the fail judging means is provided with a plurality of actuating means, and each of the actuating means being able to actuating the fail judging means.

15. A four-wheel steering system in accordance with claim 14 in which the control means is provided with a driving condition detecting sensor, a control unit for receiving signals from the sensor and producing control signals to the rear wheel steering mechanism, a first fail judging means provided in the control unit, and a second fail judging means provided independent of the control unit for judging an unusual condition of the control means based on the signals from the sensor.

16. A four-wheel steering system in accordance with claim 15 in which the driving condition detecting means includes a vehicle speed sensor and a rear wheel steering amount sensor, the control unit being adapted to receive signals from the vehicle speed sensor and to produce steering signals for steering the rear wheels in a direction opposite to the direction in which the front wheels are steered when the vehicle speed is low and in the same direction as the direction in which the front wheels are steered when the vehicle speed is high, and the second fail judging means being adapted to receive signals from the vehicle speed sensor and the rear steering amount sensor and to produce failure signals of the control means when it is detected that the rear wheels are steered in a direction opposite to a direction in which the front wheels are steered in a high vehicle speed condition.

17. A four-wheel steering mechanism in accordance with claim 16 in which the second fail judging means is provided with timer means for producing failure signals of the control means when it is detected for more than a predetermined period that the rear wheels are steered in a direction opposite to a direction in which the front wheels are steered in a high vehicle speed condition.

18. A four-wheel steering system in accordance with claim 8 in which the first fail-safe means changes a value of the steering ratio set by the steering ratio setting means to zero.

19. A four-wheel steering system in accordance with claim 8 wherein the fail judging means is provided with first fail judging means and second fail judging means adapted to be actuated independently for judging different fail conditions.

20. A four-wheel steering system for motor vehicle including
a front wheel steering mechanism for steering front wheels in response to an operation of a steering wheel,
a rear wheel steering mechanism for steering rear wheels in accordance with the steered movement of the front wheels,
control means having driving condition detecting means for detecting a vehicle driving condition and controlling the rear wheel steering mechanism in accordance with the vehicle driving condition,
fail judging means for judging of a failure of the control means and producing a failure signal denoting the failure, and
fail-safe means for receiving the failure signal from the fail judging means and controlling the rear wheel steering mechanism independently from the control means when the control means is in an unusual condition, wherein
the fail-safe means being provided with first fail-safe means and second fail-safe means adapted to be actuated independently for different fail-safe controls,
the first and second fail safe means including means for providing a steering angle for the rear wheels with zero.

21. A four-wheel steering system in accordance with claim 20 wherein the fail judging means is provided with first fail judging means and second fail judging means adapted to be actuated independently for judging different fail conditions.

22. A four-wheel steering system in accordance with claim 6 in which the rear wheel steering mechanism includes a steering ratio changing mechanism for changing the steering ratio, and a hydraulic cylinder for producing a steering force for the rear wheels by a hydraulic pump, the first fail-safe means being adapted to drive the steering ratio changing mechanism and the second fail-safe means being constituted by relief valve means provided in a hydraulic system between the hydraulic pump and the hydraulic cylinder.

23. A four-wheel steering system in accordance with claim 22 in which the rear wheel steering mechanism is provided with a centering spring for positioning the rear wheels at a neutral position.

24. A four-wheel steering system in accordance with claim 22 in which the rear wheel steering mechanism is provided with a stepping motor for driving the steering ratio changing mechanism, the control means being adapted to speculate the present stepped position of the stepping motor based on information memorized in the control means when the control means cannot grasp the correct stepped portion of the stepping motor and to cause the first fail-safe means to drive the stepping motor when it is judged that the rear wheels are steered at a negative steering condition wherein the rear wheels is angularly positioned in a direction opposite to the front wheels through the speculation of the control means so that the steering changing mechanism is driven so as to escape the negative steering condition of the rear wheels.

25. A four-wheel steering system in accordance with claim 24 in which the first fail-safe means drives the stepping motor to position the steering ratio changing mechanism at a position where the steering ratio is zero.

* * * * *